US010643334B2

(12) United States Patent
Zhou

(10) Patent No.: US 10,643,334 B2
(45) Date of Patent: May 5, 2020

(54) IMAGE PRESENTATION CONTROL METHODS AND IMAGE PRESENTATION CONTROL APPARATUSES

(71) Applicant: Beijing Zhigu Rui Tuo Tech Co., Ltd, Beijing (CN)

(72) Inventor: Liang Zhou, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 17 days.

(21) Appl. No.: 15/122,915

(22) PCT Filed: Mar. 12, 2015

(86) PCT No.: PCT/CN2015/074064
§ 371 (c)(1),
(2) Date: Aug. 31, 2016

(87) PCT Pub. No.: WO2015/149612
PCT Pub. Date: Oct. 8, 2015

(65) Prior Publication Data
US 2017/0076461 A1    Mar. 16, 2017

(30) Foreign Application Priority Data

Apr. 1, 2014   (CN) .......................... 2014 1 0128751

(51) Int. Cl.
*G06K 9/00* (2006.01)
*G06T 7/194* (2017.01)
(Continued)

(52) U.S. Cl.
CPC .............. *G06T 7/194* (2017.01); *G06T 7/11* (2017.01); *G06T 7/136* (2017.01); *H04N 5/272* (2013.01);
(Continued)

(58) Field of Classification Search
None
See application file for complete search history.

(56) References Cited

U.S. PATENT DOCUMENTS 7,133,022 B2   11/2006   Grabert
9,182,598 B2   11/2015   Sako et al.
(Continued)

FOREIGN PATENT DOCUMENTS

CN    1608222 A    4/2005
CN    102339204 A   2/2012
(Continued)

OTHER PUBLICATIONS

International Search Report for PCT Application No. PCT/CN2015/074064, dated Jun. 15, 2015, 3 pages.

*Primary Examiner* — Fred H Hu
(74) *Attorney, Agent, or Firm* — Amin, Turocy & Watson, LLP

(57) ABSTRACT

Embodiments of this application disclose an image presentation control method and an image presentation control apparatus. The method comprises: acquiring at least one piece of background information corresponding to a presentation background of a first region; determining at least one presentation region parameter of at least one image at least according to the at least one piece of background information; and presenting, in the first region, the at least one image according to the at least one presentation region parameter. In the embodiments of this application, according to a background environment feature of a first region, an appropriate region is selected for image presentation before an image is presented, thereby optimizing the visual presentation effect corresponding to the image and improving the user experience.

36 Claims, 6 Drawing Sheets

(51) Int. Cl.
*H04N 9/31* (2006.01)
*H04N 5/272* (2006.01)
*G06T 7/136* (2017.01)
*G06T 7/11* (2017.01)
*G02B 27/00* (2006.01)
*G02B 27/01* (2006.01)

(52) U.S. Cl.
CPC ......... *H04N 9/3182* (2013.01); *H04N 9/3194* (2013.01); *G02B 27/0093* (2013.01); *G02B 27/017* (2013.01); *G02B 2027/014* (2013.01); *G02B 2027/0138* (2013.01); *G02B 2027/0178* (2013.01); *H04N 9/3179* (2013.01)

(56) References Cited

U.S. PATENT DOCUMENTS

| | | | |
|---|---|---|---|
| 9,183,605 | B2 | 11/2015 | Matsuoka et al. |
| 2004/0193331 | A1 | 9/2004 | Kashiwada et al. |
| 2008/0284987 | A1* | 11/2008 | Yonezawa ............ H04N 9/3185 353/70 |
| 2010/0079468 | A1 | 4/2010 | Pance et al. |
| 2011/0018897 | A1* | 1/2011 | Uchiyama ............ H04N 9/3176 345/619 |
| 2011/0316896 | A1* | 12/2011 | Okamoto ............ H04N 9/3182 345/690 |
| 2012/0019433 | A1* | 1/2012 | Inagaki ................. G06F 3/1454 345/1.1 |
| 2012/0182416 | A1* | 7/2012 | Kawaguchi ......... H04N 9/3185 348/128 |
| 2012/0249501 | A1 | 10/2012 | Yonishi |
| 2013/0106815 | A1 | 5/2013 | Virolainen et al. |
| 2014/0063473 | A1 | 3/2014 | Pasolini |

FOREIGN PATENT DOCUMENTS

| | | |
|---|---|---|
| CN | 103002240 A | 3/2012 |
| CN | 103020954 A | 4/2013 |
| CN | 103179365 A | 6/2013 |
| CN | 103338342 A | 10/2013 |
| CN | 103561223 A | 2/2014 |
| CN | 103929606 A | 7/2014 |
| EP | 2663080 A1 | 11/2013 |
| TW | 200951612 A | 12/2009 |
| WO | 2008047889 A1 | 4/2008 |
| WO | 2013140594 A1 | 9/2013 |

\* cited by examiner

IMAGE PRESENTATION CONTROL METHODS AND IMAGE PRESENTATION CONTROL APPARATUSES

RELATED APPLICATION

The present application is a U.S. National Stage filing under 35 U.S.C. § 371 of international patent cooperation treaty (PCT) application No. PCT/CN2015/074064, filed Mar. 12, 2015, and entitled "IMAGE PRESENTATION CONTROL METHODS AND IMAGE PRESENTATION CONTROL APPARATUSES", which claims the benefit of priority to Chinese Patent Application No. 201410128751.1, filed on Apr. 1, 2014, which applications are hereby incorporated into the present application by reference herein in their respective entireties.

TECHNICAL FIELD

This application relates to the field of image processing, and in particular, to image presentation control methods and image presentation control apparatuses.

BACKGROUND

With continuous development of technologies, manners of visual presentation to users are also increasingly diversified. When visual presentation is performed by using an opaque self-luminous display device, such as a television set or a computer monitor, the background of the visual presentation does not need to be considered; however, when an image is presented by projecting the image to a physical surface and reflecting the image to a user fundus or is presented in a near-to-eye see through manner, the image of the background corresponding to the presentation enters the user fundus.

SUMMARY

An example, non-limiting objective of this application is to provide an image presentation control technology.

According to a first example aspect, this application provides an image presentation control method, comprising:
  acquiring at least one piece of background information corresponding to a presentation background of a first region;
  determining at least one presentation region parameter of at least one image at least according to the at least one piece of background information; and
  presenting, in the first region, the at least one image according to the at least one presentation region parameter.

According to a second example aspect, this application provides an image presentation control apparatus, comprising:
  an information acquisition module, configured to acquire at least one piece of background information corresponding to a presentation background of a first region;
  a parameter determining module, configured to determine at least one presentation region parameter of at least one image at least according to the at least one piece of background information; and
  a presentation module, configured to present, in the first region, the at least one image according to the at least one presentation region parameter.

According to a third example aspect, this application provides a portable device, comprising the image presentation control apparatus.

In at least one embodiment of this application, according to at least one background environment feature of a first region, an appropriate region is selected for image presentation before an image is presented, thereby optimizing the visual presentation effect corresponding to the image and improving the user experience.

DETAILED DESCRIPTION

Figure 1:
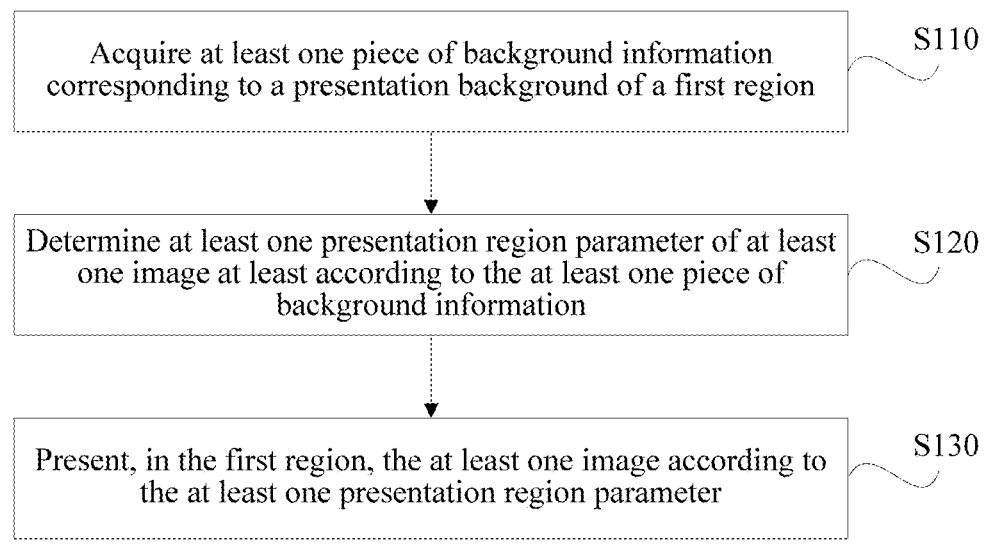
FIG. 1 is an example flowchart of an image presentation control method according to an embodiment of this application.

Various embodiments of this application are further described below in detail with reference to accompanying drawings (a same element is marked by a same number in the accompanying drawings) and embodiments. The following embodiments are intended to describe this application, but not intended to limit the scope of this application.

A person skilled in the art may understand that, the terms such as "first" and "second" in this application are merely used to distinguish different steps, devices, modules, or the like, which do not represent any specific technical meanings, nor indicate a certain logical order between them.

During visual presentation, some presentation manners generally are affected by the background environment, for example, presentation manners such as projecting an image to a physical surface, directly projecting an image to a user fundus by using a near-to-eye display technology, or displaying an image at a near-to-eye position in a see through manner by using a device such as smart glasses. In this case, a background image corresponding to the presented image also enters the user fundus, and therefore, a final image seen by a user is the overlap of the presented image and the background image; in other words, the quality of the presented image is affected by the background image.

Therefore, an embodiment of this application provides an image presentation control method, comprising:
  S110: Acquire at least one piece of background information corresponding to a presentation background of a first region.
  S120: Determine at least one presentation region parameter of at least one image at least according to the at least one piece of background information.
  S130: Present, in the first region, the at least one image according to the at least one presentation region parameter.

In this embodiment of this application, the presentation is visual presentation.

In this embodiment of this application, the image may be a visually presented text, pattern, video, or the like.

In this embodiment of this application, a presentation position of an image is determined according to a presentation background of the image, which can effectively reduce the impact of the presentation background on the presented image during visual presentation of the image, and is especially appropriate in a scenario with a non-specific presentation background, improving the user experience.

Implementations of the steps in this embodiment of this application are further described below by using the following example embodiments.

S110: Acquire at least one piece of background information corresponding to a presentation background of a first region.

In this embodiment of this application, the first region may be: a presentation implementable region, a region of field of view of a user, or an information acquirable region.

The presentation implementable region is a region in which a presentation device currently can implement presentation, and the presentation implementable region is related to the performance and the like of the presentation device. Assuming that the presentation device is a projector that directly projects an image to a physical surface, the presentation implementable region is related to the current orientation, projection implementable angle range, projection depth range, and the like of the projector.

The information acquirable region is a region range within which the background information can be acquired currently, and the information acquirable region is related to the performance of an information acquisition module, such as a sensor, that acquires the background information. Assuming that the sensor is an image collection module, the information acquirable region is related to the image collection angle range and image collection depth of the image collection module.

In this embodiment of this application, a space range corresponding to the first region generally is larger than a space range corresponding to the presentation region of the image, and therefore, in this embodiment of this application, an appropriate region can be selected from the first region and used to present the image.

A person skilled in the art may know that, the first region may also be another possible region range that is preset.

In addition, in this embodiment of this application, the range of the first region may also be automatically adjusted according to an application scenario. In this example embodiment, the method further comprises determining the first region.

In this embodiment of this application, the at least one piece of background information corresponding to the presentation background comprises at least one type of the following information:

texture information, color information, luminance information, and flatness information of the presentation background.

In this embodiment of this application, the texture information of the presentation background comprises: texture distribution information and texture complexity information. The texture complexity information may be measured by using the number of pixels, the number of colors of pixels, and the like in an image region corresponding to a texture. For example, in an embodiment, the texture distribution information and complexity information may be analyzed by using a discrete cosine transform algorithm.

In this embodiment of this application, the texture of the presentation background may be generated by the texture of the pattern on the surface of an object, the contour of an object, distribution of multiple objects, and the like in the presentation background.

In this embodiment of this application, the flatness information of the presentation background indicates a flatness level of the presentation background. In the presentation manner of projecting an image to a physical surface, the flatness of the physical surface may affect presentation of the image. In this case, when a presentation region parameter of the image is determined, flatness information of the physical surface needs to be considered, and a region with a flat surface is selected as far as possible to present the image.

In an example embodiment of this embodiment of this application, it is feasible to determine the presentation region parameter of the image only according to one type of the background information. In another example embodiment of this embodiment of this application, the presentation region parameter of the image may be determined by comprehensively considering the multiple types of background information.

Certainly, a person skilled in the art may know that, besides the several types of background information listed above, the presentation region parameter of the image may also be determined by using other background information that affects image presentation.

In this embodiment of this application, the method further comprises:

acquiring at least one background image of the presentation background.

In this embodiment of this application, the background image of the presentation background may be collected by using an image collection module (for example, a camera).

In an example embodiment of this application, step S110 comprises:

acquiring the at least one piece of background information according to the at least one background image.

In this implementation manner of this application, image processing may be performed on the at least one background image, to obtain texture information, color information, flatness information, and/or luminance information corresponding to the presentation background.

In another example embodiment of this embodiment of this application, one or more of the background information may also be acquired in another manner. For example, the luminance information of the presentation background may be collected by using a photosensitive sensor, and the flatness information of the presentation background may be determined by using a depth sensor.

For a portable device (for example, a wearable device), when using the device, the user may move or the user may be on a moving carrier (for example, on a bus), and therefore, the presentation background may continuously change; in addition, the presented image may also continuously change, for example, the at least one image may be an image in a video. Therefore, the presentation region parameter of the at least one image needs to be dynamically adjusted at a frequency. In this embodiment of this application, step S110 comprises: acquiring the at least one piece of background information according to a sampling period.

In an example embodiment of this embodiment of this application, the sampling period may be set to a fixed value, for example, a fixed value set by default, a value manually set by the user, or a value corresponding to a presentation frequency of the at least one image.

In another example embodiment of this embodiment of this application, the sampling period may be automatically adjusted according to an environment change, a motion state of the user, or the like. In this implementation manner, the method further comprises:

determining the sampling period.

In an example embodiment of this embodiment of this application, the sampling period may be determined according to an image attribute of the at least one image, or the sampling period may be determined according to a background attribute of the presentation background, or the sampling period may be determined according to an external instruction.

In an example embodiment, the image attribute of the at least one image comprises:

an image change frequency of the at least one image.

For example, when the at least one image is a group of photos that are automatically played according to a set time in a slide manner, the sampling period may correspond to the set time, for example, be the same as the set time, and the background information is acquired before each next photo is played (for example, within 0.1 second before the playback).

In an example embodiment, the image attribute of the at least one image comprises:

a dynamic/static attribute of the at least one image.

Herein, the dynamic/static attribute of the image comprises that: the image is a static picture, for example, a photo, or a picture inserted in a webpage; or is an image in a dynamic video, for example, an image of each frame in a movie.

When the image is a static picture, the sampling period may be, for example, set to a long time; when the image is an image in a dynamic video, the sampling period may be, for example, set to a short time.

In this implementation manner, when the at least one image corresponds to a dynamic video, the image attribute further comprises:

an image scenario attribute of the at least one image.

In this implementation manner, the image scenario attribute of the image comprises:

whether the image is a close-short image or a long-shot image.

Generally, when the image is a long-shot image, because the scene of the long-shot image generally does not suddenly change to a great extent, correspondingly, the sampling period may be set to long; however, the scene of a close-shot image generally changes much, and therefore, the sampling period may be set to short.

In an example embodiment of this embodiment of this application, the background attribute comprises:

a background change attribute.

In this implementation manner, the background change attribute comprises a change frequency of the background and a change amount of the background.

In this implementation manner, the background change attribute may be determined according to motion posture information of the user.

Generally, when the user moves, the background changes accordingly. Therefore, in an example embodiment, the motion posture information of the user may be acquired by using a motion posture collection component of the user, thereby determining the background change attribute. Herein, the motion posture collection component may be, for example, an acceleration sensor and/or a gyroscope, and the motion posture collection component may be, for example, integrated on a head-mounted device used by the user.

In another example embodiment, the motion of the user may also be determined by using a global position system (GPS) or an indoor positioning module, thereby determining the background change attribute. For example, when the user is taking a bus, motion information of the user is determined according to position information collected by the GPS, thereby determining the sampling period.

In this embodiment of this application, the method further comprises:

determining the background attribute according to at least one background image corresponding to the presentation background.

For example, in this implementation manner, the background attribute may also be determined by using the change amount of the collected background image.

Because a user operation usually affects content of an image needing to be presented, in a possible embodiment of this application, the sampling period is determined according to an external instruction.

A possible application scenario may be, for example:

A user performs a zooming operation on a piece of content in a first image that has already been presented, and after a zooming instruction corresponding to the zooming operation is acquired, a second image corresponding to the first image and the zooming instruction needs to be presented; in this case, in this method, one acquisition of background information is triggered according to the zooming instruction, and a presentation region parameter corresponding to the second image is adjusted according to the background information.

S120: Determine at least one presentation region parameter of at least one image at least according to the at least one piece of background information.

In this embodiment of this application, the presentation region parameter of the at least one image comprises a position and shape of a presentation region of the at least one image.

In this embodiment of this application, it is determined, according to the at least one piece of background information, that some regions in the presentation background are inappropriate for image presentation, for example, the texture of the presentation background is complex or the luminance of the presentation background is excessively high; in this case, an appropriate presentation region parameter is selected to avoid the regions that are inappropriate for image presentation.

In this embodiment of this application, step S120 may be determining the presentation region parameter according to one piece of the background information, or determining the presentation region parameter according to multiple pieces of the background information.

In an example embodiment of this embodiment of this application, when the presentation region parameter is determined, besides the background information, a parameter of the image also needs to be considered, for example, the presentation region parameter may need to be determined by considering both the color information in the background information and color information of the image. Therefore, in this implementation manner, step S120 is:

determining the at least one presentation region parameter according to the at least one piece of background information and at least one piece of image data that corresponds to the at least one image.

In this embodiment of this application, the at least one piece of image data comprises at least one of the following:
a color parameter of the at least one image, luminance information of the at least one image, and a content distribution parameter of at least one piece of content in the at least one image.

In an example embodiment, assuming that the background information is color information of the presentation background, and the image data is color information of the image, in this case, step S120 is determining the presentation region parameter of the image according to the color information of the presentation background and the color information of the image. For example, when content of the image is a text, when the color of the text is black, the presentation region parameter of the text is determined according to the color information of the presentation background, to cause the background corresponding to the presentation region to be light-colored; otherwise, when the color of the text is light-colored, the background corresponding to the presentation region is caused to be dark-colored.

In this embodiment of this application, in the image, some regions may be indifferent background regions while some others may be more important content regions, and therefore, the presentation region parameter may be determined according to the background information and a content distribution parameter of at least one piece of content in the at least one image, to place important content in the image at a more appropriate presentation position for image presentation.

Figure 2:
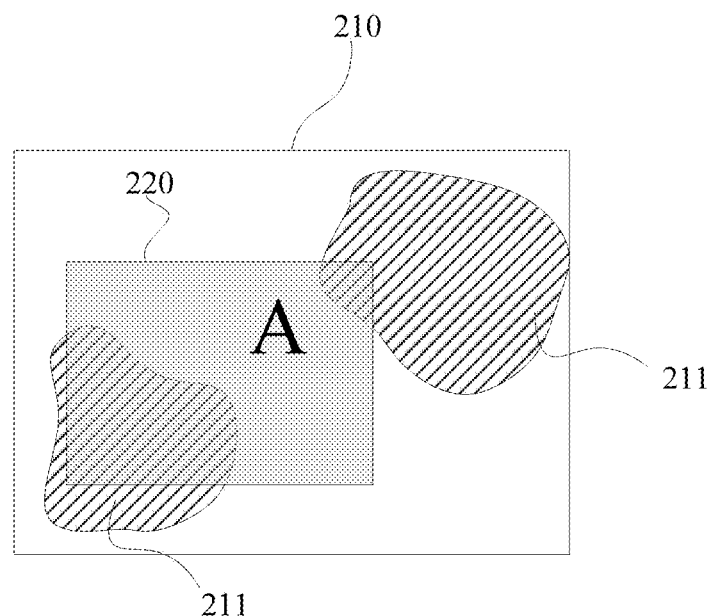
FIG. 2 is an example schematic diagram of determining a presentation region parameter of an image according to background information in an image presentation control method according to an embodiment of this application.

As shown in FIG. 2, in an example embodiment, a first region 210 comprises two interfering regions 211 that affect presentation of an image 220 (for example, a region of which the texture is excessively complex, the luminance is excessively high, or the flatness level is insufficient), the image 220 comprises a content region A, and other regions are indifferent background regions. In this case, when a presentation region position of the image is determined, it is only required to set that the content region A avoids the interfering regions 211, and it does not matter even if the presentation effect of the background regions is affected by the interfering regions 211.

In some example embodiments, the presentation region corresponding to the presentation region parameter determined in step S120 may exceed a range of field of view of a user or a presentation range of an image presentation device, and therefore, in this implementation manner, between steps S120 and S130, the method further comprises:
determining, according to the at least one presentation region parameter, whether a presentation region of the at least one image exceeds a set second region; and
corresponding to that the presentation region exceeds the second region, providing a piece of prompt information.

In this implementation manner, the second region comprises one or more of the following:
a region of field of view of a user, and a set view region in the field of view of a user and a presentation implementable region.

The set view region in the field of view of the user is a region in which the user can comfortably view the presented image, which may have a default value, or a value obtained by means of machine learning by performing training for the user.

Certainly, in this embodiment of this application, the second region may also be another region set according to a user requirement.

In this embodiment of this application, the first region comprises the second region.

The prompt information may be visual prompt information, sound prompt information, or the like, for example, text or pattern prompt information presented in the field of view of the user, or a tone made by a loudspeaker.

This embodiment is described by using the following application scenario.

In an example embodiment, the first region may be a presentation implementable region, the second region is a region of field of view of a user, and the presentation implementable region is larger than the region of field of view.

The presentation region, determined according to step S120, of the image exceeds the region of field of view of the user, that is, the current region of field of view of the user does not have an appropriate presentation region; in this case, an arrow may be displayed in the field of view of the user, which points to the presentation region to prompt the user to look at the presentation region.

In another example embodiment, the first region may be an information acquirable region, the second region is a presentation implementable region, and the information acquirable region is larger than the presentation implementable region. For example, in an example embodiment, the background information is acquired by using one or more cameras on a pair of smart eyeglasses, the one or more cameras can acquire background information within the 360 degree angle range of the user; in this implementation manner, the image is displayed by using a see through lens of the smart eyeglasses, and the presentation implementable region of the image is restricted by the position of the lens. If it is determined, according to the background information, that a region behind the user is a presentation region appropriate for image presentation, the user may be prompted by using the prompt information, to cause the user to adjust the orientation of the eyes, and therefore, the image can be presented in the presentation region.

S130: Present the at least one image according to the at least one presentation region parameter.

In an example embodiment of this embodiment of this application, in step S130, the at least one image may be presented by means of see through near-to-eye display.

The see through near-to-eye display is displaying the image at a position near to the eye of the user in a see through manner, wherein while seeing the displayed image, the user can also see a background image in the field of view through the displayed image. Herein, for example, the image may be displayed by a pair of smart glasses on a lens of the glasses in a see through manner, wherein while seeing the displayed image, the user can also see the background image in the field of view as the line of sight passes through the lens.

In an example embodiment of this embodiment of this application, in step S130, the at least one image may be presented by directly projecting the image to a user fundus.

The directly projecting the image to a user fundus is directly projecting, at a position near to the eye of the user, an image, to be presented to the user, to a fundus of the user by using a micro projection component and an optical component forming the optical path between the micro projection component and the user eye, wherein likewise, while seeing the projected image, the user can also see a background image in the field of view through the projected image.

In an example embodiment of this embodiment of this application, in step S130, the at least one image may be presented by projecting the image to a physical surface.

A person skilled in the art may understand that, in the method of the specific implementation manners of this application, sequence numbers of the steps do not mean an execution order, and the execution order of the steps should be determined according to functions and internal logic of the steps, and should not be construed as any limitation on the implementation processes of the implementation manners of this application.

Figure 3:
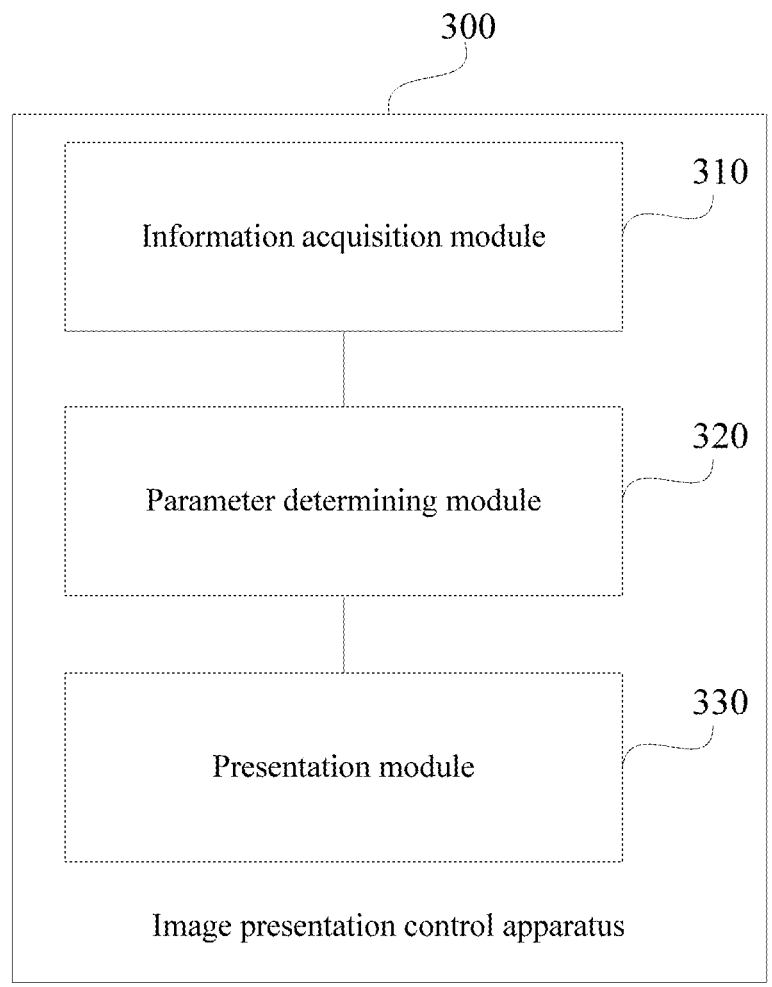
FIG. 3 is an example schematic structural diagram of an image presentation control apparatus according to an embodiment of this application.

As shown in FIG. 3, an embodiment of this application further discloses an image presentation control apparatus 300, comprising:

an information acquisition module 310, configured to acquire at least one piece of background information corresponding to a presentation background of a first region;

a parameter determining module 320, configured to determine at least one presentation region parameter of at least one image at least according to the at least one piece of background information; and a presentation module 330, configured to present, in the first region, the at least one image according to the at least one presentation region parameter.

In this embodiment of this application, the presentation is visual presentation.

In this embodiment of this application, the image may be a visually presented text, pattern, video, or the like.

With the apparatus 300 in this embodiment of this application, a presentation position of an image is determined according to a presentation background of the image, which can effectively reduce the impact of the presentation background on the presented image during visual presentation of the image, and is especially appropriate in a scenario with a non-specific presentation background, improving the user experience.

Implementations of the modules in this embodiment of this application are further described below by using the following implementation manners.

In this embodiment of this application, the first region may be: a presentation implementable region, a region of field of view of a user, or an information acquirable region.

The presentation implementable region is a region in which the presentation module currently can implement presentation, and the presentation implementable region is related to the performance and the like of the presentation module. For details, refer to the corresponding description in the method embodiment.

The information acquirable region is a region range within which the background information can be acquired currently, and the information acquirable region is related to the performance of the information acquisition module, such as a sensor, that acquires the background information. For details, refer to the corresponding description in the method embodiment.

In this embodiment of this application, a space range corresponding to the first region generally is larger than a space range corresponding to the presentation region of the image, and therefore, in this embodiment of this application, an appropriate region can be selected from the first region and used to present the image.

A person skilled in the art may know that, the first region may also be another possible region range that is preset.

Figure 4A:
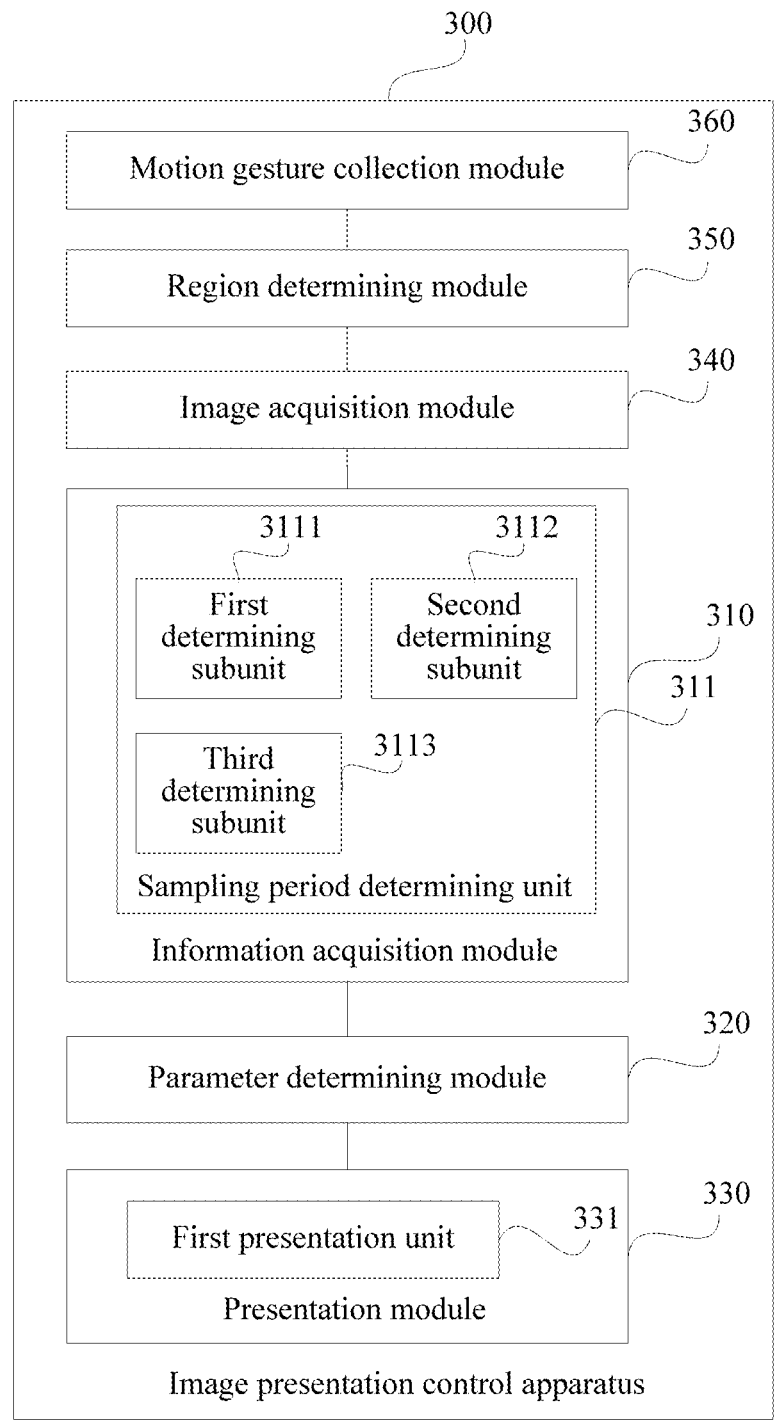
FIG. 4a, FIG. 4b, FIG. 4c, and FIG. 5 are example schematic structural diagrams of other four image presentation control apparatuses according to embodiments of this application.

In addition, the apparatus in this embodiment of this application may also automatically adjust the range of the first region according to an application scenario. As shown in FIG. 4a, in this implementation manner, the apparatus 300 further comprises: a region determining module 350, configured to determine the first region.

In this embodiment of this application, the at least one piece of background information corresponding to the presentation background comprises at least one type of the following information:

texture information, color information, luminance information, and flatness information of the presentation background.

For details, refer to the corresponding description in the method embodiment.

As shown in FIG. 4a, in an example embodiment, the apparatus 300 further comprises:

an image acquisition module 340, configured to acquire at least one background image of the presentation background.

The image acquisition module 340 may be, for example, a camera.

In this implementation manner, the information acquisition module 310 is further configured to:

acquire the at least one piece of background information according to the at least one background image.

In this implementation manner of this application, the information acquisition module 310 may perform image processing on the at least one background image, to obtain one or more of texture information, color information, flatness information, and luminance information corresponding to the presentation background.

In this embodiment of this application, the apparatus 300 may further comprise other components configured to acquire the background information, such as a photosensitive sensor, configured to collect the luminance information; and a depth sensor, configured to collect the flatness information.

In another example embodiment of this embodiment of this application, the information acquisition module 310 may also be a communications module, configured to receive one or more types of the background information from an external component by means of information exchange.

Certainly, a person skilled in the art may know that, besides the several types of background information listed above, the presentation region parameter of the image may also be determined by using other background information that affects image presentation.

In an example embodiment of this embodiment of this application, the information acquisition module 310 is further configured to:

acquire the at least one piece of background information according to a sampling period.

In an example embodiment of this embodiment of this application, the sampling period may be set to a fixed value, for example, a fixed value set by default, a value manually set by the user, or a value corresponding to a presentation frequency of the at least one image.

In another example embodiment of this embodiment of this application, the sampling period may be automatically adjusted according to an environment change, a motion state of the user, or the like. Therefore, in an example embodiment, the information acquisition module 310 may comprise:

a sampling period determining unit 311, configured to determine the sampling period.

In an example embodiment of this embodiment of this application, the sampling period determining unit 311 may comprise one or more of the following subunits:
- a first determining subunit 3111, configured to determine the sampling period according to an image attribute of the at least one image;
- a second determining subunit 3112, configured to determine the sampling period according to a background attribute of the presentation background; and
- a third determining subunit 3113, configured to determine the sampling period according to an external instruction.

When the sampling period determining unit 311 comprises more than one of the foregoing subunits, the sampling period determining unit 311 may determine the sampling period by comprehensively considering period affecting factors corresponding to the more than one subunit.

In this embodiment of this application, for the specific implementation of determining the sampling period according to an image attribute of the at least one image by the first determining subunit 3111, refer to the corresponding description in the method embodiment. Details are not described herein again.

In an example embodiment, when the sampling period determining unit 311 comprises the second determining subunit 3112, the apparatus 300 may further comprise:
- a motion posture collection module 360, configured to collect motion posture information of a user, wherein the second determining subunit 3112 is further configured to determine the background attribute according to the motion posture information of the user.

In an example embodiment, the motion posture collection module 360 may be, for example, an acceleration sensor and/or a gyroscope, and the motion posture collection module 360 may be, for example, integrated on a head-mounted device used by the user.

In another example embodiment, the motion posture collection module 360 may also be, for example, a global position system (GPS) or an indoor positioning module, configured to acquire the position of the user, thereby determining the motion posture information of the user.

In another example embodiment, the second determining subunit 3112 is further configured to:
- determine the background attribute according to at least one background image corresponding to the presentation background.

Because a user operation usually affects content of an image needing to be presented, in a possible embodiment of this application, the third determining subunit 3113 may determine the sampling period according to an external instruction. For details, refer to the corresponding description in the method embodiment.

In this embodiment of this application, the presentation region parameter, determined by the parameter determining module 320, of the at least one image comprises a position and shape of a presentation region of the at least one image.

In this embodiment of this application, the parameter determining module 320 determines, according to the at least one piece of background information, that some regions in the presentation background are inappropriate for image presentation, for example, the texture of the presentation background is complex or the luminance of the presentation background is excessively high; in this case, an appropriate presentation region parameter is selected to avoid the regions that are inappropriate for image presentation.

In this embodiment of this application, the parameter determining module 320 may determine the presentation region parameter according to one piece of the background information, or determine the presentation region parameter according to multiple pieces of the background information.

In an example embodiment of this embodiment of this application, when the presentation region parameter is determined, besides the background information, a parameter of the image also needs to be considered, and therefore, in this implementation manner, the parameter determining module 320 is further configured to:
- determine the at least one presentation region parameter according to the at least one piece of background information and at least one piece of image data that corresponds to the at least one image.

In this embodiment of this application, the at least one piece of image data comprises at least one of the following:
- a color parameter of the at least one image, luminance information of the at least one image, and a content distribution parameter of at least one piece of content in the at least one image.

For a further description of determining the presentation region parameter of the image according to the background information and image data by the parameter determining module 320, refer to the corresponding description in the method embodiment. Details are not described herein again.

Figure 4B:
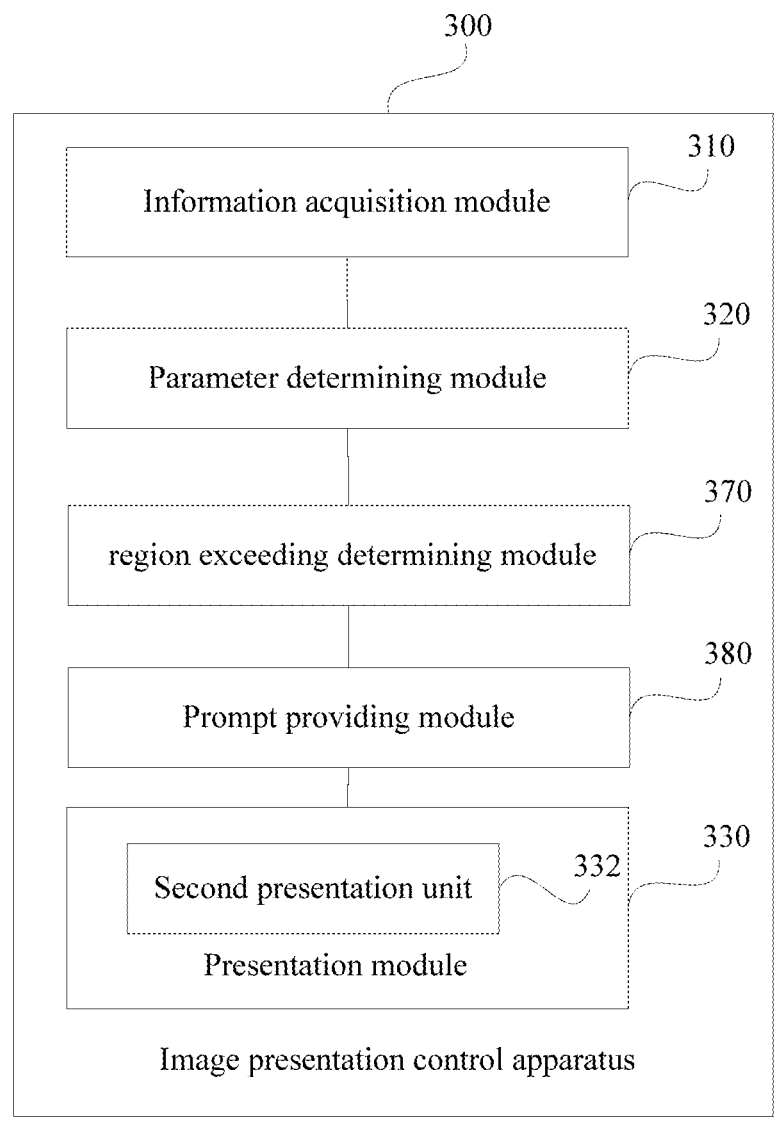

As shown in FIG. 4b, in some example embodiments, the presentation region corresponding to the presentation region parameter determined by the parameter determining module 320 may exceed a range of field of view of a user or a presentation range of an image presentation device, and therefore, in this implementation manner, the apparatus 300 further comprises:
- a region exceeding determining module 370, configured to determine, according to the at least one presentation region parameter, whether a presentation region of the at least one image exceeds a set second region; and
- a prompt providing module 380, configured to: corresponding to that the presentation region exceeds the second region, provide a piece of prompt information.

In this implementation manner, the set second region comprises one or more of the following:
- a region of field of view of a user, and a set view region in the field of view of a user and a presentation implementable region.

Certainly, in this embodiment of this application, the second region may also be another region set according to a user requirement.

In this embodiment of this application, the first region comprises the second region.

The prompt information may be visual prompt information, sound prompt information, or the like. The prompt providing module 380 may be, for example, the presentation module 330, configured to present text or pattern prompt information in the field of view of the user; or may be a loudspeaker, configured to make a tone.

For the specific application scenario of the region exceeding determining module 370 and the prompt providing module 380, refer to the corresponding description in the method embodiment. Details are not described herein again.

As shown in FIG. 4a, in an example embodiment of this embodiment of this application, the presentation module 330 comprises:
- a first presentation unit 331, configured to present the at least one image by means of see through near-to-eye display.

The see through near-to-eye display is displaying the image at a position near to the eye of the user in a see through manner, wherein while seeing the displayed image, the user can also see a background image in the field of view through the displayed image. In this implementation manner, the first presentation unit 331 may comprise, for example, a display component of a pair of smart glasses, to display the image on a lens of the glasses in a see through manner, wherein while seeing the displayed image, the user can also see the background image in the field of view as the line of sight passes through the lens.

As shown in FIG. 4b, in an example embodiment of this embodiment of this application, the presentation module 330 comprises:

a second presentation unit 332, configured to present the at least one image by directly projecting the image to a user fundus.

The second presentation unit 332 is disposed at a position near to the user eye, and may directly project an image, to be presented to the user, to a fundus of the user by using a micro projection component and an optical component forming the optical path between the micro projection component and the user eye, wherein likewise, while seeing the projected image, the user can also see a background image in the field of view through the projected image.

Figure 4C:
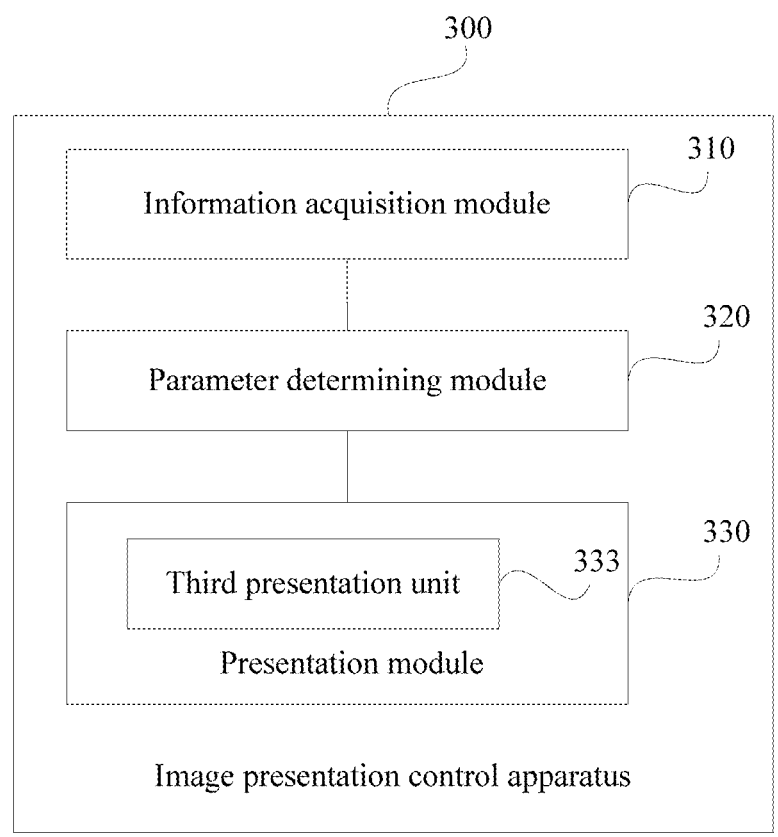

As shown in FIG. 4c, in an example embodiment of this embodiment of this application, the presentation module 330 comprises:

a third presentation unit 333, configured to present the at least one image by projecting the image to a physical surface.

The third presentation unit 333 may be, for example, a projector.

Figure 5:
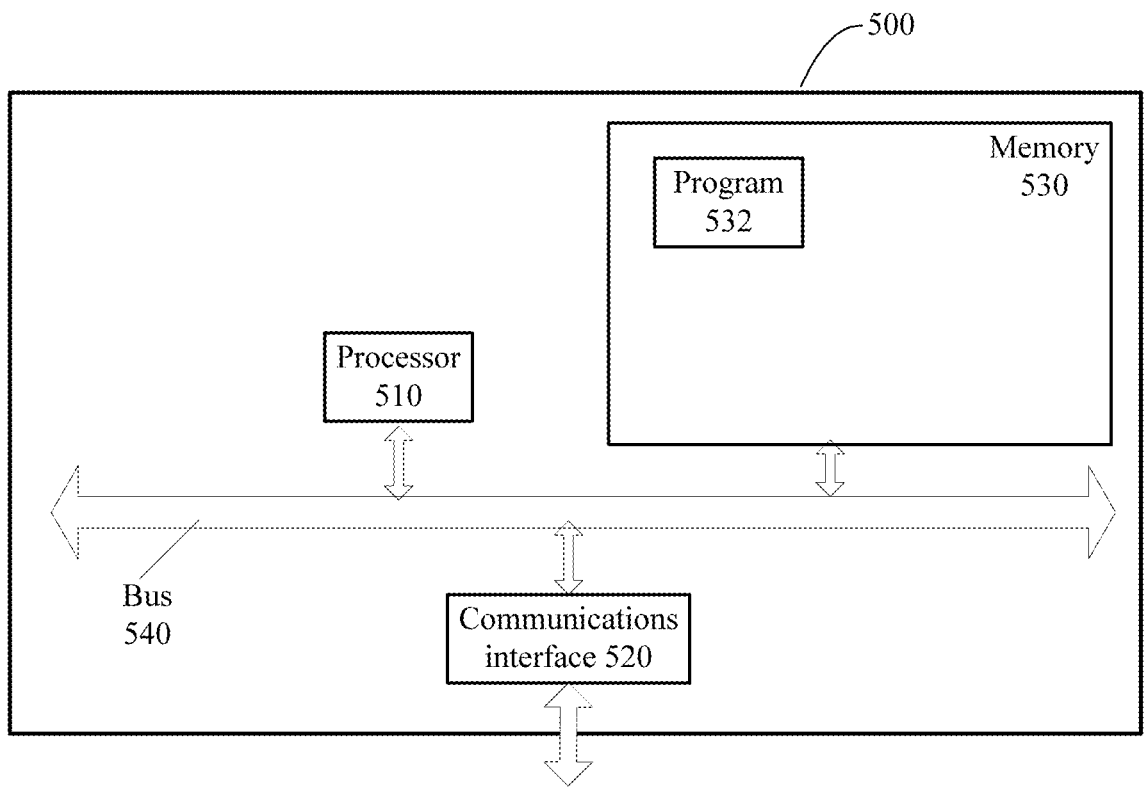

FIG. 5 is a schematic structural diagram of another image presentation control apparatus 500 according to an embodiment of this application. The specific embodiment of this application does not impose any limitation on specific implementation of the image presentation control apparatus 500. As shown in FIG. 5, the image presentation control apparatus 500 may comprise:

a processor 510, a communications interface 520, a memory 530, and a communications bus 540, wherein the processor 510, the communications interface 520, and the memory 530 communicate with each other by using the communications bus 540;

the communications interface 520 is configured to communicate with a network element such as a client; and the processor 510 is configured to execute a program 532, and specifically may execute relevant steps in the foregoing method embodiments.

Specifically, the program 532 may comprise program code, wherein the program code comprises a computer operation instruction.

The processor 510 may be a central processing unit (CPU), or an application specific integrated circuit (ASIC), or be configured or implemented as one or more integrated circuits in this embodiment of this application.

The memory 530 is configured to store the program 532. The memory 530 may comprise a high speed random access memory (RAM), and may further comprise a non-volatile memory, for example, at least one disk memory. The program 532 specifically may be used to instruct the image presentation control apparatus 500 to perform the following steps:

acquiring at least one piece of background information corresponding to a presentation background of a first region;

determining at least one presentation region parameter of at least one image at least according to the at least one piece of background information; and presenting, in the first region, the at least one image according to the at least one presentation region parameter.

For the specific implementation of the steps in the program 532, reference may be made to the corresponding description of the corresponding steps and units in the foregoing embodiments. Details are not described herein again. It may be clearly understood by a person skilled in the art that, for the purpose of convenient and brief description, for a detailed working process of the foregoing devices and modules, reference may be made to the corresponding process description in the foregoing method embodiments, and details are not described herein again.

Figure 6:
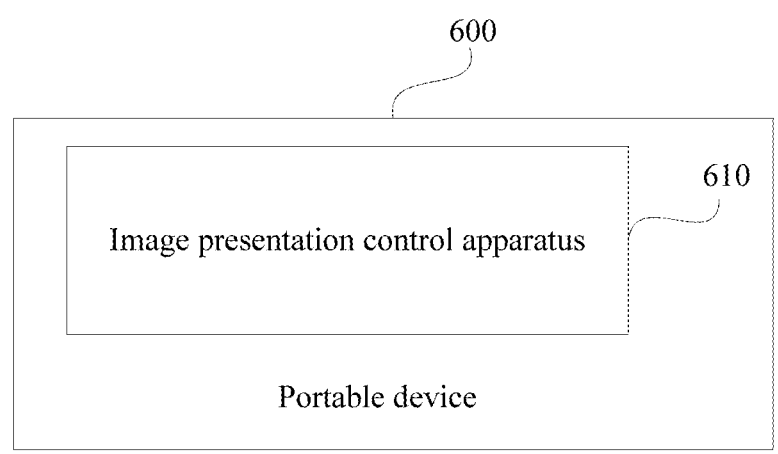
FIG. 6 is an example schematic structural diagram of a portable device according to an embodiment of this application.

As shown in FIG. 6, an embodiment of this application further provides a portable device 600, comprising the image presentation control apparatus 610 in the embodiment shown in FIG. 3, FIG. 4a, FIG. 4b, FIG. 4c, or FIG. 5.

In this embodiment of this application, the portable device may be, for example, a wearable device having a presentation module, such as smart glasses or a helmet-mounted eyepiece. In addition, the portable device may also be a portable projector.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on the particular applications and design constraint conditions of the technical solution. A person skilled in the art may use different methods to implement the described functions for each particular application, but it should not be considered that the implementation goes beyond the scope of this application.

When the functions are implemented in a form of a software functional module and sold or used as an independent product, the functions may be stored in a computer-readable storage medium. Based on such an understanding, the technical solutions of this application essentially, or the part contributing to the prior art, or a part of the technical solutions may be implemented in a form of a software product. The computer software product is stored in a storage medium and comprises several instructions for instructing a computer device (which may be a personal computer, a server, a network device, or the like) to perform all or a part of the steps of the methods described in the embodiments of this application. The foregoing storage medium comprises: any medium that can store program code, such as a USB flash drive, a removable hard disk, a read-only memory (ROM), a RAM, a magnetic disk, or an optical disc.

The foregoing descriptions are merely intended to describe this application, but are not intended to limit the protection scope of this application. A person skilled in the art may make various alternations and variations without departing from the spirit and scope of this application. Therefore, all equivalent technical solutions shall also fall within the scope of this application, and the patent protection scope of this application shall be subject to the appended claims.

What is claimed is:

1. A method, comprising:

acquiring, by a display device comprising a processor, using a sensing device, at least one piece of background information corresponding to a presentation background of a first region, based on a sampling period that is determined based on an image attribute of at least one image, wherein the presentation background is remote from the display device;
determining, by the display device, at least one presentation region parameter of the at least one image at least based on the at least one piece of background information;
determining, by the display device based on the at least one presentation region parameter, whether at least one part of a presentation region of the at least one image is outside a second region, wherein the presentation region corresponds to the at least one presentation region parameter, and the second region comprises at least one of a third region of field of view of a user and a set view region in the field of view of the user, wherein the set view region in the field of view of the user is a defined fourth region in which the user can comfortably view the presented image; and
in response to the at least one part of the presentation region being determined to be outside the second region, presenting, by the display device, a piece of prompt information; and
presenting, by the display device in the first region, the at least one image based on the at least one presentation region parameter.

2. The method of claim 1, wherein the determining the at least one presentation region parameter of the at least one image at least based on the at least one piece of background information comprises:
determining the at least one presentation region parameter based on the at least one piece of background information and at least one piece of image data that corresponds to the at least one image.

3. The method of claim 2, wherein the at least one piece of image data comprises at least one of:
a color parameter of the at least one image, luminance information of the at least one image, or a content distribution parameter of at least one piece of content in the at least one image.

4. The method of claim 1, wherein the first region comprises the second region.

5. The method of claim 1, wherein the at least one piece of background information corresponding to the presentation background comprises at least one type of:
texture information, color information, luminance information, or flatness information of the presentation background.

6. The method of claim 1, further comprising:
acquiring, by the display device, at least one background image of the presentation background.

7. The method of claim 6, wherein the acquiring the at least one piece of background information corresponding to the presentation background of the first region comprises:
acquiring the at least one piece of background information based on the at least one background image.

8. The method of claim 1, further comprising:
determining, by the display device, the sampling period.

9. The method of claim 8, wherein the determining the sampling period comprises:
determining the sampling period based on a background attribute of the presentation background.

10. The method of claim 9, further comprising:
determining the background attribute based on motion posture information of a user.

11. The method of claim 9, further comprising:
determining the background attribute based on at least one background image corresponding to the presentation background.

12. The method of claim 8, wherein the determining the sampling period comprises:
determining the sampling period based on an external instruction.

13. The method of claim 1, wherein the first region comprises at least an information acquirable region.

14. The method of claim 1, wherein the presenting the at least one image based on the at least one presentation region parameter comprises:
presenting the at least one image using see through near-to-eye display.

15. The method of claim 1, wherein the presenting the at least one image based on the at least one presentation region parameter comprises:
presenting the at least one image by directly projecting the image to a user fundus.

16. The method of claim 1, wherein the presenting the at least one image based on the at least one presentation region parameter comprises:
presenting the at least one image by projecting the image to a physical surface.

17. A display apparatus, comprising:
a processor, coupled to a memory, that executes or facilitates execution of executable modules, comprising:
an information acquisition module configured to control a sensing device to acquire at least one piece of background information corresponding to a presentation background of a first region, based on a sampling period that is determined based on an image attribute of at least one image, wherein the presentation background is remote from the display apparatus;
a parameter determining module configured to determine at least one presentation region parameter of the at least one image at least based on the at least one piece of background information;
a region exceeding determining module configured to determine, based on the at least one presentation region parameter, whether at least one part of a presentation region of the at least one image is outside a second region, wherein the presentation region corresponds to the at least one presentation region parameter, and the second region comprises at least one of a third region of field of view of a user and a set view region in the field of view of the user, wherein the set view region in the field of view of the user is a defined fourth region in which the user can comfortably view the presented image;
a prompt providing module configured to, in response to the at least one part of the presentation region being determined to be outside the second region, present a piece of prompt information; and
a presentation module configured to present, in the first region, the at least one image based on the at least one presentation region parameter.

18. The apparatus of claim 17, wherein the parameter determining module is further configured to:
determine the at least one presentation region parameter based on the at least one piece of background information and at least one piece of image data that corresponds to the at least one image.

19. The apparatus of claim 17, wherein the first region comprises the second region.

20. The apparatus of claim 17, wherein the executable modules further comprise:
an image acquisition module configured to acquire at least one background image of the presentation background.

21. The apparatus of claim 20, wherein the information acquisition module is further configured to:
acquire the at least one piece of background information based on the at least one background image.

22. The apparatus of claim 17, wherein the information acquisition module comprises:
a sampling period determining unit configured to determine the sampling period.

23. The apparatus of claim 22, wherein the sampling period determining unit comprises a second determining subunit configured to:
determine the sampling period based on a background attribute of the presentation background.

24. The apparatus of claim 23, further comprising:
a motion posture collection module configured to collect motion posture information of a user, wherein
the second determining subunit is further configured to determine the background attribute based on the motion posture information of the user.

25. The apparatus of claim 23, wherein the second subunit is further configured to:
determine the background attribute based on at least one background image corresponding to the presentation background.

26. The apparatus of claim 22, wherein the sampling period determining unit comprises a third determining subunit configured to:
determine the sampling period based on an external instruction.

27. The apparatus of claim 17, wherein the presentation module comprises:
a presentation unit configured to present the at least one image using see through near-to-eye display.

28. The apparatus of claim 17, wherein the presentation module comprises:
a presentation unit configured to present the at least one image by directly projecting the image to a user fundus.

29. The apparatus of claim 17, wherein the presentation module comprises:
a presentation unit configured to present the at least one image by projecting the image to a physical surface.

30. A portable device, comprising the image presentation control apparatus of claim 17.

31. A non-transitory computer readable medium comprising executable instructions that, in response to execution, cause a display device comprising a processor to perform operations, comprising:
acquiring, using a sensing device, a piece of background information corresponding to a presentation background of a first region, based on a sampling period that is determined based on an image attribute of at least one image, wherein the presentation background is remote from the display device;
determining a presentation region parameter of an image at least based on the piece of background information;
determining, according to the presentation region parameter, whether at least one part of a presentation region of the at least one image is outside a second region, wherein the presentation region corresponds to the presentation region parameter, and the second region comprises at least one of a third region of field of view of a user and a set view region in the field of view of the user, wherein the set view region in the field of view of the user is a defined fourth region in which the user can comfortably view the presented image; and
in response to the at least one part of the presentation region being determined to be outside the second region, presenting a piece of prompt information; and
presenting, in the first region, the image according to the presentation region parameter.

32. The non-transitory computer readable medium of claim 31, wherein the determining the presentation region parameter of the image at least the piece of background information comprises:
determining the presentation region parameter based on the piece of background information and at least one piece of image data that corresponds to the image.

33. The non-transitory computer readable medium of claim 32, wherein the at least one piece of image data comprises at least one of:
a color parameter of the image, luminance information of the image, or a content distribution parameter of at least one piece of content in the image.

34. The non-transitory computer readable medium of claim 31, wherein the first region comprises the second region.

35. The non-transitory computer readable medium of claim 31, wherein the at least one piece of background information corresponding to the presentation background comprises at least one type of:
texture information, color information, luminance information, or flatness information of the presentation background.

36. The non-transitory computer readable medium of claim 31, the operations further comprising:
acquiring, by the display device, at least one background image of the presentation background.

* * * * *